May 13, 1952     E. C. HAATVEDT     2,596,897
LIQUID LEVEL GAUGE
Filed Oct. 9, 1948
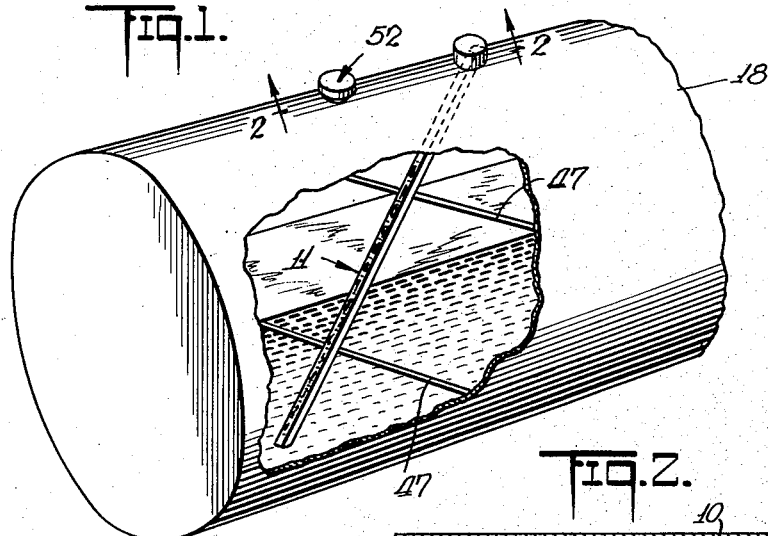
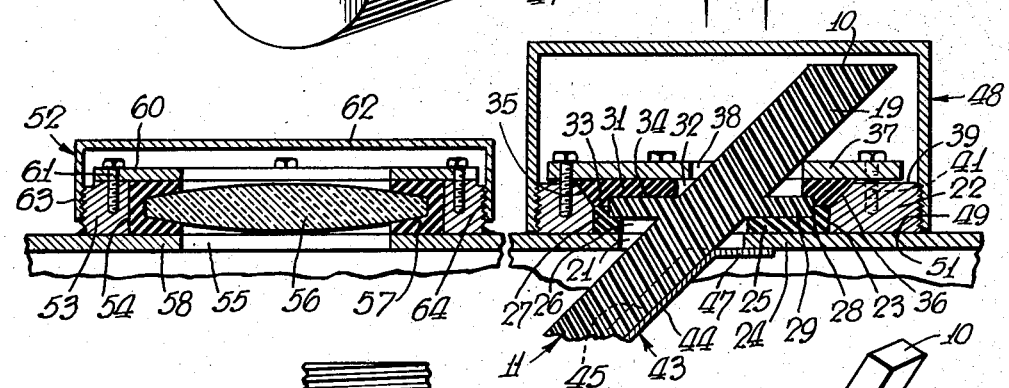
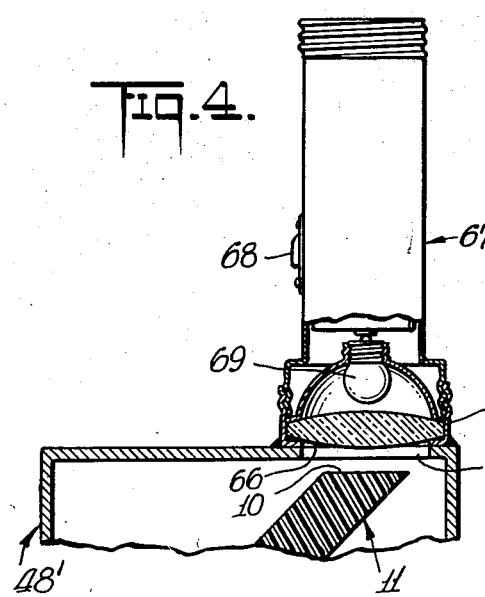
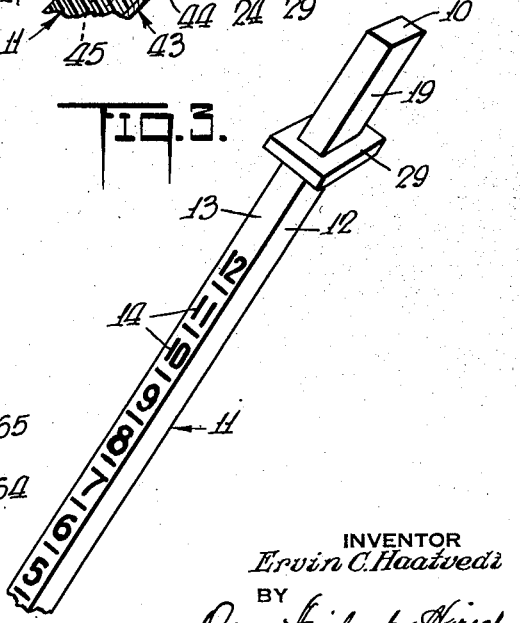
INVENTOR
Ervin C. Haatvedt
BY
Dean Fairbank & Hirsch
ATTORNEYS Patented May 13, 1952

2,596,897

UNITED STATES PATENT OFFICE 2,596,897

LIQUID LEVEL GAUGE

Ervin C. Haatvedt, Brooklyn, N. Y., assignor to Visugage, Inc., a corporation of New York Application October 9, 1948, Serial No. 53,615

6 Claims. (Cl. 73—293)

1

This invention relates to a liquid gauge or measuring instrument, more particularly of the type to measure the level of liquid in a closed container or tank and to an installation in which said instrument is incorporated as a fixture.

Where gauges are used on liquid tanks that have mechanical moving parts, floats, cables and dials, the moving parts may become deranged, especially when used on a moving vehicle such as a railroad tank car, airplane, oil tanker or the like, in which there is a great deal of vibration.

Where sight gauges which includes hollow glass tubes and fittings which are connected to the exterior of the tank are used to indicate the liquid level, the tubes and the fittings may readily clog and in addition varying pressure would affect the accuracy of the indication in the tube.

In both of these types of installations, constant maintenance and repair would be necessary and at best the user could never be sure of the accuracy of the device.

Where a direct indicating type of measuring instrument is used, such as a calibrated stick, if the latter is merely pushed into the liquid and then removed to see what portion of the length thereof has become wet, it is extremely difficult and awkward to make such readings, especially where a large tank is being measured and the stick is long. In addition the reading is very apt to be inaccurate for the liquid may splash when the measuring stick is inserted therein to give too high a reading.

Where a volatile liquid such as gasoline is measured by the above procedure, each time the tank is opened to admit of a measurement, the hazard of sparking and explosion is incurred, aside from waste due to evaporation.

Where such measuring stick is fixed in the liquid tank, it is necessary to provide a window of some sort through which the calibrations on the measuring stick may be read and to illuminate such calibrations, an electric light must be provided. If the light was inside the tank, it would have to be at the top thereof, and in the case of large tanks quite powerful in order to illuminate the entire length of the calibrated stick, no matter what level the liquid should attain. However, in such case the light would blind the observer and render it difficult if not impossible for him to read the calibrations. This is also true if the light is positioned outside the tank and the rays therefrom are directed into the tank.

Where the light is inside the tank, it would soon become obscured by the drying of the tank

2 contents thereon, making it difficult to read the calibrations on the measuring stick. In addition, with the use of a light inside the tank, if it should break in a tank of volatile or inflammable liquid, the live electric wires would probably cause fire and explosion with resultant danger to the user and destruction of the vehicle, ship or apparatus.

It is accordingly among the object of the invention to provide a measuring device that is light in weight, that is devoid of mechanical moving parts, floats, cables or dials that may stick or become out of order, that is devoid of pipes, tubes or fittings that may become clogged, and the accuracy of which is not affected by varying pressures, that may readily be installed in a liquid tank with but a minimum of expense and that once installed may readily be read without opening the tank, that may readily be removed for cleaning and maintenance, that does not require electric lights or other illuminating means to be installed in the tank, yet that clearly and accurately indicates the level of the liquid therein.

According to the invention, a calibrated rod, stick or bar which functions as a light conduit is inserted into the tank, the liquid level of which is to be measured, with the upper end of the rod protruding from the surface of the tank. A window is provided in the surface of the tank to afford a clear view of the length of the rod and a source of light is applied to the protruding end of the rod to illuminate the length thereof.

Preferably the rod is of light conducting material and the length thereof within the liquid tank is inclined desirably at an angle of approximately 45 degrees with respect to the top of the tank and the window is positioned over the inclined face of the rod so that all the calibrations thereon may be clearly visible. The rod is preferably supported at such inclination by a suitable bracket rigidly mounted in the tank and a suitable gland, gasket or stuffing box is provided at the top of the tank to make a liquid and gas tight seal.

In the accompanying drawings in which is shown one or more of various possible embodiments of the several features of the invention, Fig. 1 is a fragmentary perspective view of a liquid tank with parts broken away to show the gauge installation;

Fig. 2 is a fragmentary longitudinal cross-sectional view on a larger scale, taken along line 2—2 of Fig. 1, Fig. 3 is a fragmentary perspective view of the measuring rod, and Fig. 4 is a fragmentary cross sectional view with parts broken away of another embodiment of the device.

Referring now to the drawings, the device comprises a rod or stick 11, preferably rectangular in cross section, though it may be round, oval, triangular or other suitable cross-section, of a light transmitting material such as "Lucite" or similar plastic, the inherent characteristics of which are such as to permit light to pass longitudinally through the length thereof, but to preclude lateral escape of the light so long as the outer surfaces of the rod are highly polished. The rod 11 is therefore preferably polished on its rear face and two side faces as at 12 and has a roughened front face 13 on which the calibrations 14 are formed, and has desirably, though not necessarily, a roughened surface 10 at the upper end thereof against which light may be directed.

As shown in Fig. 3, the calibrations are preferably engraved in the face 13 and painted with an opaque dark material to form a dark outline on the face 12. However, the calibrations could be painted directly on the roughened face 13 or all four faces of the rod could be highly polished and only the calibrations roughened to enable the light to pass laterally therethrough to illuminate the same and enable them to be clearly visible or the calibrations could be formed by drilling a plurality of holes into the rod to define the outline of such calibrations.

Rod 11 is positioned with the upper portion 19 thereof passing through an opening 21 in the top of the tank 18 and with the length of the rod extending downwardly into said tank, as shown in Fig. 1. In order rigidly yet removably to support rod 11, a hub 22 is provided, affixed as by welding to the upper surface of the tank encompassing opening 21 therein. Hub 22 has an opening 23 therein larger in size than said rod and also larger than opening 21 in the container.

Positioned in the opening in hub 22 and seated on the rim 24 about opening 21 in the tank 18 is a gasket 25, preferably of rubber, having an opening 26 therethrough and provided with a rim 27 on the face thereof, preferably integral therewith, rim 27 forming a shoulder 28. Desirably rim 27 defines a substantially rectangular cup to receive a correspondingly shaped collar 29 which may also be of plastic rigidly connected to rod 11, as shown at an angle of approximately 45 degrees thereto. A second gasket 31 is also provided, preferably of rubber, having an opening 32 therethrough and provided with a rim 33 on the face thereof, preferably integral therewith, rim 33 forming a shoulder 34. Desirably rim 33, like rim 27, also forms a substantially rectangular cup and rims 27 and 33 are of such size that when the upper portion 19 of rod 11 is passed through opening 32 in gasket 31, the faces of rims 27 and 33 will abut, the cups defining a rectangular cavity in which collar 29 may be positioned.

As shown in Fig. 2, the side wall 35 of gasket 31 is beveled and coacts with the correspondingly beveled portion 36 of the wall of opening 23 in hub 22 to form a seal. In order to clamp gaskets 25 and 31 together securely to hold the collar 29 therebetween, and to form a liquid and gas tight seal about opening 21 in the tank, a lock ring 37 is provided having an opening 38 therein through which portion 19 of rod 11 extends. Ring 37 is seated on the upper surface 39 of hub 22 and secured thereto by screws 41 threaded into hub 22. As the upper surface of gasket 31 normally extends slightly above the surface 39 of hub 22 and as rim 27 and rim 33 is each slightly greater in thickness than one-half the thickness of collar 29, when screws 41 are tightened the rubber gaskets will be compressed, forming a seal at the abutting faces of the rims and at the beveled portion 35 of this gasket 31.

In order to provide support for the length of the inclined rod 11 in the tank 18, respectively where the latter is of large size, a channel member 43 may be provided, on the face 44 of which rod 11 rests, with the side walls 45 of the channel member straddling rod 11. The upper end of the channel member 43 desirably has a projecting finger 47 extending horizontally therefrom and affixed as by welding to the under face of the roof of the tank. To reinforce the channel member 43, a plurality of braces 47 are desirably provided, two being illustratively shown in Fig. 1, extending transversely across the tank and affixed to the side walls thereof as by welding. As is illustratively shown in Fig. 1, the braces are positioned so as to support the channel bar at an angle of approximately 45 degrees.

Desirably a cover is provided for the upper end of the rod to protect it against injury. The cover may comprise a cup 48, the depending wall of which has an internally threaded rim 49 which coacts with a correspondingly threaded portion 51 on the periphery of hub 22.

In order to read the calibrated rod 11, a window 52 is provided in the top of tank 18. The window is positioned over the inclined face 13 of rod 11 and desirably comprises a hub 53 having an opening 54 therein, said hub being affixed to the top of the tank as by welding and encompassing an opening 55 therein. A lens 56 is also provided having a rubber collar 57 around the periphery thereof, as shown in Fig. 2. The collar is of such diameter that it will snugly fit into the opening 54 and when seated on the rim 58 about opening 55 will extend slightly above the upper surface of hub 53. In order to retain the lens in place, a clamp ring 60 is provided which may be secured to the top of hub 53 by screws 61 threaded into said hub. When screws 61 are tightened, they will force ring 60 against collar 57 to compress the latter and make an air and liquid tight seal about opening 55. To protect lens 56, a cover cap 62 is preferably provided, the depending wall 63 of which is threaded at its rim 64 which coacts with a correspondingly threaded portion on the periphery of hub 53.

To use the device after it has been installed as above described, to determine the level of the liquid in the tank, the attendant need merely unscrew covers 48 and 62 and apply a source of light to the roughened end 10 of rod 11 while looking through the window 52. The light may be from a flashlight, an electric bulb or the like, or during the day, sunlight may be sufficient.

As the light passes through the rod 11, the roughened face 13 thereof will intercept the rays of light and glow brightly and hence the opaque calibrations thereon will stand out and may readily be seen through the window. With the tank partially filled with liquid, the face 13 of the portion of rod 11 below the level of the liquid will not appear to glow brightly when seen through the window, due to the fact that even with a transparent liquid such as water or alcohol, the light passing therethrough will be diffused. Hence a sharp line of demarcation will appear on the rod at the liquid level which may readily be read by the observer.

In Fig. 4 in which corresponding parts have the same reference numerals primed, an alternative construction for cover 48' is shown.

Cover 48' has an opening 64 therein which is aligned with the top 10 of rod 11. A threaded cap 65 is provided, having an opening 66 therein and affixed as by welding on cover 48' with openings 66 and 64 aligned. A conventional flashlight 67, preferably tubular as shown, is threaded into cap 65 to be securely retained therein in upright position. To take a reading it is only necessary to move switch 68 of the flashlight which will thereupon cast rays of light on roughened surface 10 of rod 11. In either of the embodiments shown, when the tank is empty and it is desired to clean the rod, it is only necessary to remove the cover 48 on hub 22 and screws 41. The rod may thereupon be withdrawn from the container carrying with it ring 37 and gasket 31 which are seated on gasket 25.

With the above construction, all readings may be made without opening the tank and hence there will be no danger of volatile fumes escaping which may readily catch on fire. The device may readily be installed in a tank without adding materially to the cost thereof, and as even the channel member 43 and supporting braces 47 may be dispensed with in small tanks for the stuffing box and collar 29 will provide adequate support for the rod, even conventional tanks now on the market may be provided with the measuring device, for it is only necessary to make two openings in the wall thereof to provide for the window 52 and the stuffing box.

Where the device is to be incorporated in very large tanks such as in those on oil tankers, as a large access port or manhole is available to provide entry into the tank for cleaning, it is readily a simple matter to install the channel member 43 and supporting braces 47.

As many changes could be made in the above construction and many apparently widely different embodiments of this invention could be made without departing from the scope of the claims, it is intended that all matter contained in the above descripion or shown in the accompanying drawings shall be interpreted as illustrative and not in a limiting sense.

Having thus described my invention, what I claim as new and desire to secure by Letters Patent of the United States is:

1. A liquid tank having an opening therein, a stuffing box affixed to the outside of said tank about said opening, a measuring rod of light conducting material extending downwardly into tank through said stuffing box and said opening and removably mounted therein, means in said stuffing box coacting with said rod securely to retain the latter in said tank, one end of said rod extending beyond said stuffing box and exposed on the outside of said tank, said exposed end having a roughened surface, whereby when rays of light are directed against said roughened surface they will pass through the length of said rod, said rod having calibrations along its length on the surface thereof and having roughened areas on said surface to intercept the rays of light passing therethrough to illuminate said calibrations to render them clearly readable, means in said tank to support said rod at an inclination with respect to the top thereof with said calibrations facing upwardly, and a window in the wall of said tank positioned over said inclined rod, through which said calibrations may be seen.

2. The combination set forth in claim 1, in which said window comprises a hub member having an opening therein positioned over an opening in said tank and of larger diameter than the latter, a lens, a resilient collar encompassing the periphery of said lens and positioned in said hub member, a seal ring having an opening therein positioned over the said lens and affixed to the top surface of said hub securely to retain said collar and lens in said opening in said hub.

3. The combination set forth in claim 1, in which the means in said tank to support said rod comprises a substantially U-shaped channel member in which said rod is positioned, said channel member extending downwardly into said tank parallel to said rod, and means affixed to the wall of said tank to support said channel member.

4. The combination set forth in claim 1 in which said rod has a collar affixed thereto near the upper end thereof and said stuffing box has a pair of gaskets around said rod and encompassing said collar and means to clamp said gaskets together securely to retain said collar between said gaskets in said stuffing box and form a liquid tight seal about said rod.

5. The combination set forth in claim 1 in which said stuffing box comprises a circular hub member having an opening therein positioned over the opening in said tank and of larger diameter than the latter, a pair of gaskets having an opening therein and positioned in the opening of said hub, said gaskets having outstanding rims on the periphery of the faces thereof, said rims abutting to form a cavity, a seal ring having an opening therein and affixed at its periphery on the upper surface of said hub, said seal ring securely retaining said gaskets in said hub, said rod extending through said openings in said seal ring, said gaskets and said tank and having a collar affixed thereto and positioned in said cavity, said seal ring securely retaining said rod in fixed position.

6. The combination set forth in claim 5 in which a cup shaped cover is provided removably affixed to and encompassing said hub member and the top surface of said cover has an opening therein and a lamp is positioned on said cover over said opening whereby when said opening is positioned over the roughened end of said rod, rays of light from said lamp will be directed thereagainst.

ERVIN C. HAATVEDT.

REFERENCES CITED

The following references are of record in the file of this patent:

UNITED STATES PATENTS

| Number | Name | Date |
|---|---|---|
| 116,272 | Collins et al. | June 27, 1871 |
| 1,264,143 | Bennett | Apr. 30, 1918 |
| 1,707,965 | Scantlebury | Apr. 2, 1929 |
| 1,724,716 | Kryzanowsky | Aug. 13, 1929 |
| 1,865,007 | Hicks et al. | June 28, 1932 |
| 1,925,999 | DeGiers | Sept. 5, 1933 |
| 1,926,945 | Hipp | Sept. 12, 1933 |
| 2,027,145 | Beebe | Jan. 7, 1936 |
| 2,179,476 | Andrus | Nov. 14, 1939 |
| 2,195,422 | Overmeyer | Apr. 2, 1940 |
| 2,246,464 | Gerber | June 17, 1941 |
| 2,378,249 | Ruth | June 12, 1945 |